United States Patent Office 2,737,436
Patented Mar. 6, 1956

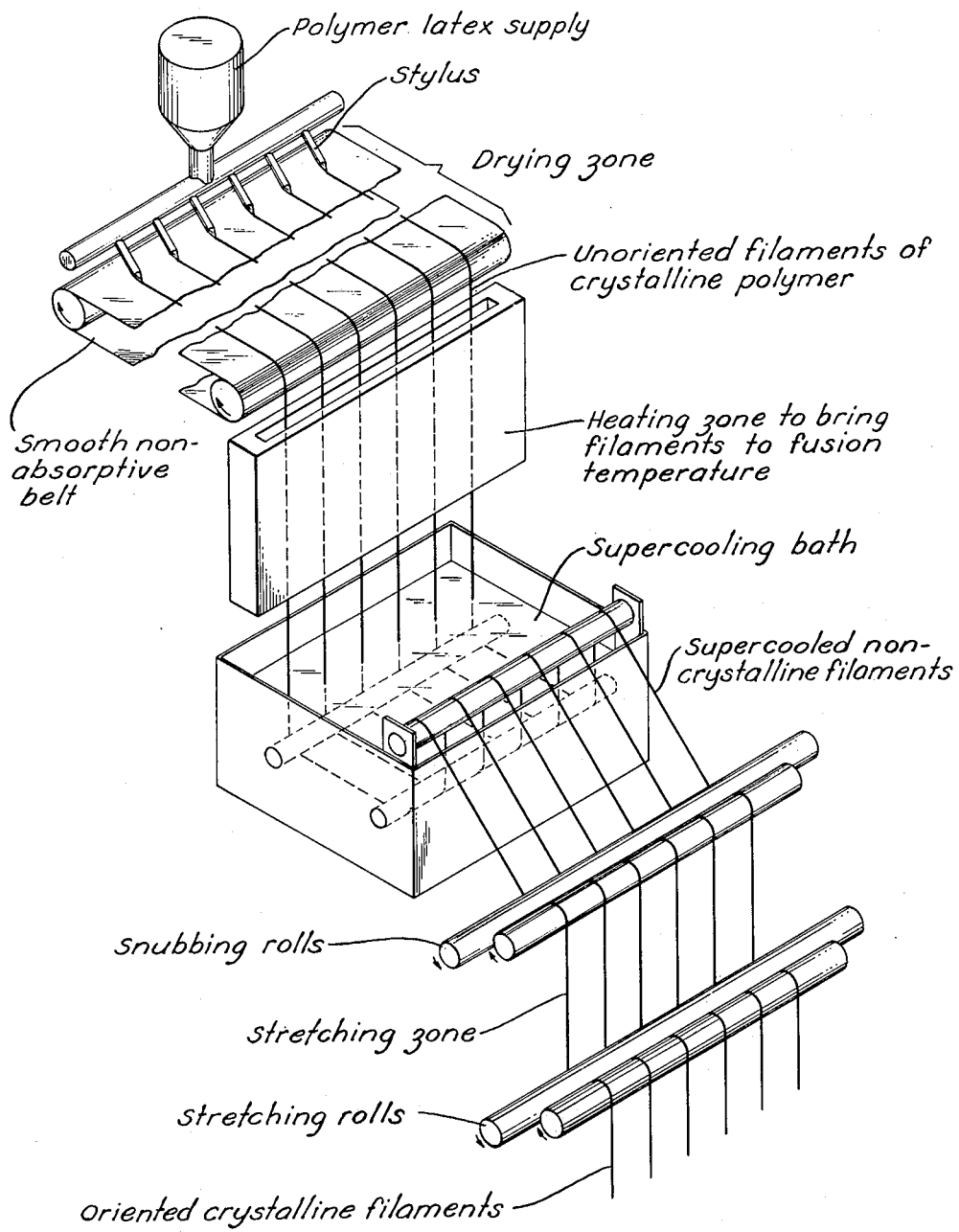

2,737,436

**MAKING CONTINUOUS FIBERS FROM A NOR-
MALLY CRYSTALLINE POLYMER LATEX**

Edgar W. Le Boeuf, Midland, Mich., assignor to The
Dow Chemical Company, Midland, Mich., a corporation of Delaware Application December 3, 1952, Serial No. 323,941

6 Claims. (Cl. 18—54)

This invention relates to a method for the production of continuous fibers from the emulsion or "latex" obtained by the emulsion polymerization of a monomer or mixture of monomers which forms crystalline polymers.

It is known that the vinylidene halides and vinylidene cyanide form polymers and copolymers which are normally crystalline. That is, when such polymers are examined by X-ray diffraction methods they give evidence of submicroscopic crystallinity. If these crystalline polymers are melted, the crystallinity disappears. If they are chilled rapidly from the molten condition, there is a supercooling effect, and the supercooled polymers, though temporarily non-crystalline, may be crystallized by prolonged standing or by being heated to a temperature above room temperature but below their melting point, or by being cold worked, as by rolling or stretching. Due to their normally crystalline character, they are capable of forming strong and highly oriented articles.

The conventional procedure for making filaments from the normally crystalline polymers and copolymers involves extrusion, supercooling and cold stretching. Unfortunately, the vinylidene halide and cyanide polymers and crystalline copolymers cannot be extruded to make useful products unless they are plasticized, and usually it has been found necessary, as well, to include in the composition to be extruded various heat stabilizing agents. The presence of such modifiers detracts from the properties of the extruded filaments.

Attempts to produce unplasticized fibers or filaments from the said normally crystalline polymers by first dissolving the polymer in a solvent and then spinning a fiber from the solution have been quite unsuccessful. The crystalline polymers and copolymers of the vinylidene halides and cyanide are not readily soluble in any economical solvent. The only solvents which can be used for spinning fibers from these polymeric materials are high boiling and accordingly difficult to use in dry spinning of these heat sensitive polymers. Due to the initial cost and inevitable process losses of such solvents, they are uneconomical to use in either wet or dry spinning methods.

Although the normally crystalline polymers and copolymers containing vinylidene halides or cyanide are useful products, the unplasticized latex-like emulsions in which they may be formed do not find wide commercial use because such latices cannot form continuous or coherent deposits if spread on a smooth surface and dried after they have been shipped to a user. The so-deposited solids are found to be in powder form. The aqueous polymer emulsions should be more economical sources of fibers, if a method can be devised for making them, than are the solid polymers used in extrusion or the solutions of polymers in organic solvents.

It is an object of this invention to find a method whereby highly oriented fibers may be made from the latex of an unplasticized and normally crystalline polymer or copolymer comprising a vinylidene halide or cyanide as the predominant polymerized constituent. A related object is to provide such a method which does not require high temperature extrusion of the polymer and does not employ solvents for the polymer.

A method has been found whereby the foregoing and related objects are attained. It has been found that the dispersed particles of the normally crystalline polymers and copolymers comprising vinylidene halides or cyanide, prepared in aqueous emulsion, are initially and temporarily amorphous and non-crystalline and that, upon standing, the polymer particles crystallize gradually, as evidenced by their changing X-ray diffraction patterns. According to the invention, a narrow and thin linear stream of the latex of an unplasticized, normally crystalline polymer is deposited on a non-absorptive smooth surface while a significant proportion of the polymer solids are still uncrystallized, the so-deposited latex is dried, the resulting filamentary product is stripped from the smooth surface, is heated briefly to a fusion temperature to destroy any crystallinity, is cooled rapidly to well below the fusion temperature and is stretched at once to effect orientation and recrystallization. The resulting unplasticized fiber is comparable in strength and is superior in its freedom from discoloration to the fibers made by melt spinning or by solvent spinning.

The practice of the method is facilitated by the use of those emulsions in which the dispersed polymeric particles are chiefly under 1000 Angstrom units in diameter, and best results are obtained with those emulsions in which the polymeric particles have diameters in the range from 400 to 600 Angstrom units. Such latices retain a useful amorphous condition for at least a week, while latices in which there is a preponderance of particles over 1000 A. in diameter are at least 60 per cent crystalline in less than a week. A latex can only be used in the present method so long as a substantial proportion of the dispersed particles of the polymer are amorphous and are capable of binding the crystalline particles. The exact minimum amount of amorphous material in a useful polymer latex is hard to determine, and varies widely with differences in polymer composition, average particle size and size distribution of the particles. In some cases as little as 25 per cent, more commonly 30 to 40 per cent, and sometimes over 50 per cent of the particles must be amorphous if the latex is to form a coherent filamentary deposit. It is understood, of course, that all of the amorphous particles are but temporarily so, as they are all capable of becoming crystalline in the latices here concerned.

Any of several methods may used for depositing a narrow and thin linear stream of the polymer latex on a smooth surface. One or a plurality of stylus-like instruments may be used to deposit the latex, or one or more thin driven disks, each dipping into a supply of the latex, may make contact with and transfer the latex to a smooth moving belt or rotating drum. The deposited stream of latex, while wet, is of the order of 1.5 millimeters or less in width, and 0.5 millimeter or less in thickness. The most useful emulsions are those having solids contents of 30 to 45 per cent, by weight, and, when the thin linear deposits of these latices are dried, the filamentary deposit is less than 0.25 millimeter thick. The deposited latex stream may be dried by infra-red lamps, by heat conducted through the surface on which the stream is deposited or by circulating warm air, to form a continuous, coherent, filament which, at this stage, has little strength. This filament is heated to a fusion temperature, but not to a decomposition temperature, and is then cooled quickly and is stretched to from 2 to 4 or more times its original length, until substantially fully crystallized. This condition has been attained when additional tension results only in elastic stretch rather than in permanent elongation. The stretching reduces both the width and thickness of the fiber, and forms a product with only slightly greater width than thickness, i. e., one with a slightly flattened oval cross-section. The annexed drawing illustrates one method of carrying out the invention.

When the latex employed is one having less than 30 per cent solids, it does not deposit consistently a coherent filament even when freshly prepared and when the solids are composed chiefly of the desired fine particles. When the latex has over 45 per cent solids, the polymer tends to crystallize too rapidly.

It is not a sufficient condition that the latex solids be amorphous and of the indicated small diameter. They must also be capable of crystallization. Thus, when such non-crystalline polymers as polystyrene or polyacrylonitrile are made in aqueous emulsion, it is impossible to form a coherent filamentary deposit under normal atmospheric conditions from the unplasticized latex, whether it is freshly prepared or has been aged.

The monomers which form normally crystalline polymers, and which are useful in the present invention, may be copolymerized with minor amounts of other monoethylenically unsaturated compounds to form normally crystalline copolymers which may also be used in the method of this invention. The amount of the comonomer which may be used with vinylidene chloride, vinylidene bromide, vinylidene chlorobromide, vinylidene cyanide or the vinylidene halocyanides, to form normally crystalline copolymers, is variable, depending on the particular monomers employed. In most cases there is little or no evidence of crystallinity in a copolymer containing over 30 per cent of another compound copolymerized with a vinylidene halide or cyanide, and in many cases the amount of such other monomer cannot exceed 15 per cent if the copolymer is to be normally crystalline. Examples of the numerous comonomers which may be used to form latices useful in the present invention are vinyl chloride, vinyl bromide, vinyl acetate, acrylonitrile, methacrylonitrile, styrene, chlorostyrene, and methyl or ethyl acrylates or methacrylates. When copolymerizing two or more monomers, each of which will form normally crystalline polymers, the copolymer is normally crystalline, regardless of the proportions of the monomers employed. Thus, while a copolymer of 50 per cent vinylidene chloride and 50 per cent styrene is non-crystalline, a copolymer of equal parts of vinylidene chloride and vinylidene bromide is normally crystalline. An especially useful range of copolymers in the present invention are those containing from 90 to 98 per cent of vinylidene chloride and from 10 to 2 per cent of acrylonitrile. Another very useful range of commercially available copolymers are those containing from 10 to 20 per cent of vinyl chloride copolymerized with 90 to 80 per cent of vinylidene chloride.

In a specific example, a monomeric mixture of 85 per cent vinylidene chloride and 15 per cent vinyl chloride was polymerized in aqueous emulsion, using 2 per cent of an anionic emulsifier based on the weight of monomers, at a ratio of 45 parts by weight of monomers to 55 parts by weight of water. The particles were predominantly of diameters from 400 to 600 A. The latex was stabilized by the post-addition of 2 per cent of another anionic emulsifier, based on the weight of dispersed copolymer.

The latex was thickened by the addition of 1 per cent of water-soluble methyl hydroxypropyl cellulose, based on the weight of polymer. The so-thickened latex, which experience had shown to remain usefully non-crystalline for about 7 days, was used while only 1 day old. Some of the latex was loaded into several tubes having discharge tips resembling those of fountain pens. These instruments were mounted on a support in parallel and with their tips in the same plane, and parallel deposits of the latex were made on a smooth glass surface. The deposited linear strips of latex were dried rapidly under infrared lamps and the filamentary products were stripped from the glass surface, heated to about 170° C., chilled rapidly to about 25° C., and then stretched to about 4 to 5 times their original lengths. As first prepared, the filaments were flat and they had little strength. After the described treatments, they were of a flattened oval cross-section and had strengths exceeding 20,000 pounds per square inch of cross-sectional area.

I claim:

1. In a method for making strong fibers from an aqueous dispersion of an unplasticized, normally crystalline polymeric material selected from the group consisting of vinylidene chloride, vinylidene bromide, vinylidene cyanide, vinylidene chlorobromide, vinylidene chlorocyanide, vinylidene bromocyanide, copolymers thereof with one another, and copolymers thereof with minor amounts of another monoethylenically unsaturated polymerizable compound which dispersion is made by the emulsion polymerization of the corresponding monomers, and is one in which the polymeric particles are temporarily amorphous and non-crystalline when first formed, the steps which consist in: depositing a thin and narrow linear stream of such a dispersion in which the dispersed polymeric particles are substantially all under 1000 A. in diameter and while a substantial proportion of the polymeric material therein is still non-crystalline, on a smooth, non-absorptive surface; drying the filamentary deposit; stripping the filamentary deposit from the smooth surface; heating the filamentary product to a fusion temperature for a time insufficient to cause decomposition; chilling the fused filament to supercool it; and, stretching the supercooled filament to effect orientation and crystallization.

2. The method claimed in claim 1, wherein the copolymer dispersion has a polymeric content of from 30 to 45 per cent by weight.

3. The method claimed in claim 2, wherein nearly all of the dispersed polymeric particles have diameters between 400 and 600 A.

4. The method claimed in claim 1, wherein the linear deposit is initially less than 1.5 millimeters wide and less than 0.5 millimeter thick.

5. The method claimed in claim 1, wherein the dispersion employed is that of a copolymer of from 80 to 90 per cent vinylidene chloride and from 20 to 10 per cent vinyl chloride.

6. The method claimed in claim 1, wherein the dispersion employed is that of a copolymer of from 90 to 98 per cent vinylidene chloride and from 10 to 2 per cent acrylonitrile.

References Cited in the file of this patent

UNITED STATES PATENTS

| 2,322,976 | Schmitz | June 29, 1943 |
| 2,509,857 | Borchert et al. | May 30, 1950 |
| 2,600,681 | Park et al. | June 17, 1952 |
| 2,627,088 | Alles et al. | Feb. 3, 1953 |